Nov. 23, 1948. A. F. PITYO ET AL 2,454,338
APPARATUS FOR WELDING
Filed June 13, 1947
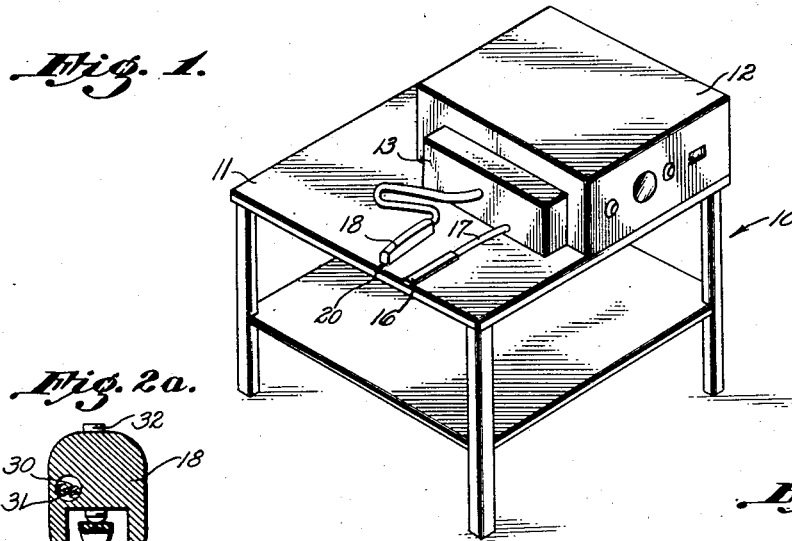
Fig. 1.
Fig. 2a.
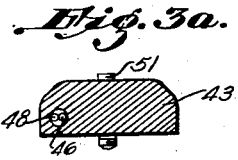
Fig. 3a.
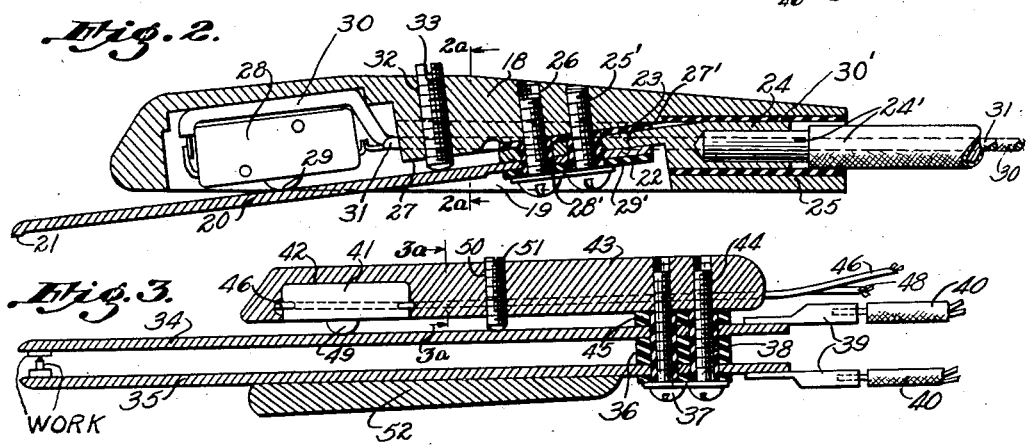
Fig. 2.
Fig. 3.
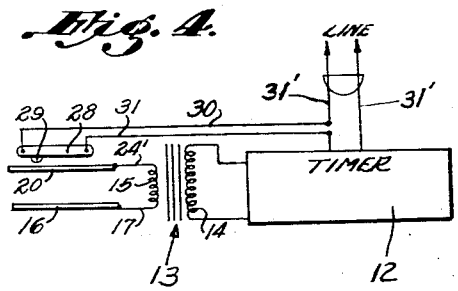
Fig. 4.
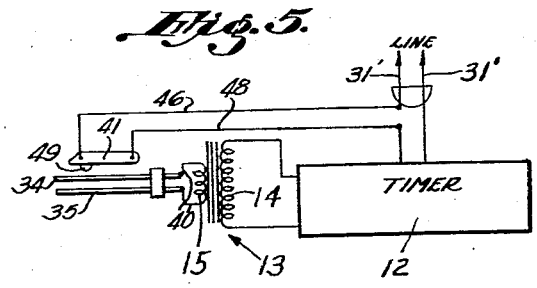
Fig. 5.
Inventors:
HARRY E. BUTTERFIELD, JR.
ALBERT F. PITYO
By BP. Wilburn
Attorney Patented Nov. 23, 1948

2,454,338

UNITED STATES PATENT OFFICE 2,454,338

APPARATUS FOR WELDING

Albert F. Pityo, Clifton, and Harry E. Butterfield, Jr., Maplewood, N. J.

Application June 13, 1947, Serial No. 754,410

6 Claims. (Cl. 219—4)

The present invention relates to a method of and apparatus for welding.

An important object of the invention is to provide the proper pressure for the particular weld.

A further object of the invention is to automatically provide the proper resilient pressure for the particular weld, which pressure will follow through during the welding period, when the contacting parts are plasticized.

A further object of the invention is to provide means for closing a welding circuit when a resilient electrode is flexed by pressure applied thereto.

A further object of the invention is to provide adjustable means for regulating the pressure applied to the work, so that a selected pressure may be so applied, and utilizing the selected pressure for closing the welding circuit.

A further object of the invention is to provide means for affording a selected pressure upon the work at the instant the welding circuit is closed.

A further object of the invention is to provide a welding pencil which may be held in the hand of the operator for manipulation and including a resilient electrode and adjustable means to regulate the tension of the electrode.

A further object of the invention is to provide a tweezer unit having adjustable means to regulate the bending action of the resilient electrode so that such electrode will close the welding circuit when a selected pressure is applied to the work.

A further object of the invention is to provide apparatus of the above mentioned character, which is of simplified construction, inexpensive to manufacture and easy to operate.

Other objects and advantages of the invention will be apparent during the course of the following description.

In the accompanying drawings forming a part of this application and in which like numerals are used to designate like parts throughout the same, Figure 1 is a perspective view of apparatus embodying the invention, Figure 2 is a central vertical longitudinal section through the pencil unit, Figure 2a is a transverse section taken on line 2a—2a of Figure 2, Figure 3 is a central vertical longitudinal section through the tweezer unit, Figure 3a is a transverse section taken on line 3a—3a of Figure 3, Figure 4 is a diagrammatic view of the pencil unit and associated circuit, and, Figure 5 is a similar view of the tweezer unit and associated circuit.

Attention being called first to Figures 1, 2, 2a, and 4, the numeral 10 designates a table or stand having a top 11. Arranged upon the top 11 is a welding or soldering timer unit 12, controlling the operation of a transfer 13. This transformer is of the usual step-up type and includes a primary winding 14 and a secondary winding 15. We have shown the timer unit 12 and transformer 13 and associated elements as constituting a portable unit, but the invention is not restricted to this arrangement as the transformer 13 may be arranged remote from the timer unit 12 and connected therewith by leads.

Mounted upon the top 11 and held in place thereon by any suitable means is a stationary lower electrode 16, isulated by the top 11 or other suitable means, and connected by a wire 17 with one end of the secondary winding 15, Figure 4. The invention is not restricted to having the electrode 16 stationary, as it may be movable to be clamped or held securely against the work to be welded, by any suitable means.

We provide a pencil unit for coaction with the stationary electrode 16, and this pencil unit includes a rigid elongated pencil handle 18, having the shape and size to be readily held in the hand. This pencil handle is formed of stiff or rigid suitable material, such as metal. The handle 18 has a recess 19 in its bottom, which recess is open at its lower end. This recess receives an upper resilient metal electrode 20, extending longitudinally thereof, and having a welding point 21. This electrode 20 is in the form of an eleongated blade or leaf. The rear end 22 of the electrode 20 contacts with a shank 23, carried by a tubular terminal 24 arranged within a longitudinal opening 25 formed in the rear end of the pencil handle 18, as shown. The rear end 22 and shank 23 overlap and have electrical engagement and are clamped together by screws 25', engaging within screw threaded openings 26, formed in the pencil handle 18, as shown. The shank 23 is clamped toward the wall 27. The tubular terminal 24 receives the end of a wire 24', connected with the opposite end of the winding 15. The shank 23 is insulated from the wall 27 by an insulating strip 27' and the screws 25' are insulated from the shank 23 and end 22 of the elctrode by insulating sleeves 28' and there is also an insulating strip 29'. The tubular terminal 24 is insulated from the handle 18 by an insulating strip 30'.

Mounted within the forward end of the recess

19 is a switch 28 embodying a reciprocatory push button or plug 29. This switch is biased open. The switch 28 is suitably atached to the pencil handle 18, so that its casing is rigidly secured thereto, and the push button or plug 29 is arranged to engage with the resilient metallic electrode 20.

One terminal of the switch 28 is connected with a wire 30, Figure 4, connected in one lead wire 31', while the other terminal of this switch is connected with a wire 31, connected in the wire 31'. It is thus seen that the switch 28 is connected in series with the lead 31'.

The pencil handle 18 is provided with a transverse screw threaded opening 32, receiving an adjusting screw 33, and this screw is arranged between the switch 28 and screws 25', and engages the outer face of the resilient metallic electrode 20 at a point rearwardly of the push button 29. The screw 33 is formed of insulating material, such as fiber or plastic. The electrode 20 is at all times electrically insulated from the handle 18 and does not contact therewith.

The operation of the first form of apparatus is:

The parts to be welded are properly assembled and held in position above the table top 11 by any suitable means. One part contacts with the lower metallic electrode 16 while the other part is mounted upon the lower part. The pencil unit is now brought toward the work and the resilient metallic electrode 20 presses against the upper part to be welded. As the downward pressure upon the pencil handle increases, the upper resilient electrode 20 is flexed about the end of the adjusting screw 33 and moves toward the button 29. When the flexing of the electrode 20 reaches the selected extent to close the switch 28 such electrode will press the button 29 inwardly sufficiently and the switch will be closed. The welding circuit including the primary winding 14 is now closed. The welding circuit remains closed for the selected period and is opened at the end of such period by the usual timing mechanism 12. When the circuit is closed, current will be induced in the secondary winding 15 and passes to the electrodes 16 and 20. By adjusting the screw 33, the resilient electrode 20 may be shifted from the button or plug 29 and hence would have to be flexed a greater distance to actuate the button for closing the switch 28, thus requiring additional pressure to be applied to the resilient electrode 20 and to the work. By adjusting the screw 33 the precise selected pressure must be applied to the electrode 20 for closing the welding circuit. In this manner, the right pressure for the particular weld is automatically obtainable. Since the electrode 20 is resilient it will instantly follow through during the welding period when the parts being welded have their contacting surfaces plasticized.

In Figures 3, 3a, and 5, we have shown a modification of the invention embodying a welding tweezer. This welding tweezer comprises resilient metal electrodes 34 and 35, which are biased open. These electrodes 33 and 34 are in the form of elongated blades or leaves. The rear end of these electrodes 34 and 35 are mounted upon an insulating block 36, and clamped thereto by screws 37, which are thoroughly insulated from the electrodes 34 and 35, as shown at 38. Welded or otherwise rigidly secured to the rear ends of the electrodes 34 and 35 are tubular terminals 39, receiving wires 40 which are connected with the opposite ends of the secondary winding 15 of the transformer 13. A switch 41 is provided which is biased open and is mounted within a recess 42 formed in a rigid handle 43. This handle has screw threaded openings 44 for receiving the screws 37 and the handle 43 is spaced from the electrode 34 by an insulating collar 45. One terminal of the switch is connected with a wire 46, Figure 5, connected in one lead wire 31'. The other terminal of the switch 41 is connected with a wire 48, connected with the lead wire 31', as shown. It is thus seen that the switch 41 is connected in series with the lead wire 31'. The switch embodies a reciprocatory push button or plug 49, disposed outwardly of the resilient electrode 34, to engage therewith.

The handle 43 has a transverse screw threaded opening 50 for receiving an adjusting screw 51, the inner end of which contacts with the outer face of the resilient electrode 34, between the push button 49 and the screws 37. By adjusting the screw 51 the electrode 34 may be moved from the push button 49, and hence the electrode 34 would have to be flexed a greater distance for closing the switch 41. An increased pressure would have to be applied to the electrode 34, to close the switch. By adjusting the screw 51, the proper pressure for the particular weld may be obtained. The handle 43 may be formed of metal, in which event the screw 51 would be formed of insulating material, such as fiber, plastics, or the like. The electrode 34 is permanently insulated from the handle 43 and does not contact therewith. The electrode 35 carries a handle 52, which may be formed of any suitable material, such as metal.

The operation of this form of the apparatus is:

The parts to be welded together are arranged between the ends of the resilient metallic electrodes 34 and 35 and are held in place by any suitable means. The handles 43 and 52 are held in the hand of the operator, and are moved together by applying pressure upon the same by closing the hand. This action will move the electrodes 34 and 35 toward each other and clamp the work between them. Continued inward pressure upon the handles 43 and 52 will move these handles further toward each other and both electrodes 34 and 35 will have relative movement toward the button 49. When this movement is sufficient, the button 49 is moved inwardly sufficiently to close the switch 41. The electrode 34 may be adjusted from the button 49 by manipulation of the screw 51 and in this manner the pressure necessary to close the switch 41 may be regulated. This pressure is of course transmitted to the work held between the electrodes. When the switch 41 closes, the welding circuit is closed and the length of time that the welding circuit remains closed is controlled by the timing mechanism 12.

It is to be understood that the forms of our invention herewith shown and described are to be taken as preferred examples of the same and that various changes in the shape, size, and arrangement of parts may be resorted to without departing from the spirit of our invention or the scope of the subjoined claims, and that changes may also be made in the order of the steps of the method without departing from the spirit of the invention or the scope of the subjoined claims.

Having thus described our invention, what we claim is:

1. In welding apparatus, electrodes for receiving work between them and to receive current from a welding circuit, at least one of the electrodes being a resilient elongated blade, a handle carrying the resilient elongated blade electrode and extending longitudinally of the resilient electrode and overlapping therewith, a switch for closing the welding circuit mounted upon the handle and having a movable part arranged to be shifted by the flexing of the resilient elongated blade electrode, and an adjustable element mounted upon the handle and engaging the resilient elongated blade electrode to regulate its tension.

2. In welding apparatus, electrodes for receiving work between them and to receive current from a welding circuit, at least one of the electrodes being a resilient elongated blade, a handle carrying the resilient elongated blade electrode and extending longitudinally of the elongated blade electrode and overlapping the same, a switch biased open for controlling the operation of the welding circuit and mounted upon the handle and having a movable part to be shifted by the resilient elongated blade electrode when it is flexed toward the switch, and an adjustable element secured to the handle and engaging the resilient elongated blade electrode to regulate its tension.

3. In welding apparatus, a handle, a resilient elongated blade electrode carried by the handle and extending longitudinally of the handle and overlapping therewith, a switch mounted upon the handle and having a movable part to be shifted by the resilient elongated blade electrode when the resilient elongated blade electrode is flexed, and an adjustable element secured to the handle and engaging the resilient electrode to regulate its tension.

4. In welding apparatus, a tweezer unit including opposed elongated blade electrodes, at least one elongated blade electrode being resilient, means for connecting the elongated blade electrodes and insulating the same, the elongated blade electrodes being adapted to receive current from a welding circuit, a handle disposed near one of the resilient elongated blade electrodes and carrying the tweezer unit, said handle extending longitudinally of the resilient elongated blade electrodes and overlapping therewith, a switch carried by the handle for controlling the welding circuit and having a movable part to be engaged and shifted by the resilient elongated blade electrode when it is flexed, and an adjustable element secured to the handle and engaging the resilient elongated blade electrode.

5. In welding apparatus, resilient elongated blade electrodes arranged in opposed relation and biased open, means to attach the electrodes together, a welding circuit connected with the electrodes, a handle arranged near one elongated blade electrode and carrying the attached elongated blade electrodes, said handle extending longitudinally of the elongated blade electrodes and overlapping the same, a switch mounted upon the handle and connected in the welding circuit and having a movable part arranged to be engaged and shifted by the adjacent electrode, and an adjusting screw carried by the handle to engage the adjacent electrode.

6. In welding apparatus, a first electrode, a coacting second resilient elongated blade electrode, a welding circuit connected with the electrodes, a pencil handle carrying the resilient elongated blade electrode and separate from the first electrode, the pencil handle extending longitudinally of the resilient elongated blade electrode and overlapping therewith, a switch mounted upon the pencil handle and having a movable part to engage with the resilient electrode elongated blade and connected in the welding circuit, and an adjusting screw carried by the pencil handle for engaging the resilient elongated blade electrode.

ALBERT F. PITYO.
HARRY E. BUTTERFIELD, Jr.

REFERENCES CITED

The following references are of record in the file of this patent:

UNITED STATES PATENTS

| Number | Name | Date |
|---|---|---|
| 1,021,732 | Taylor | Mar. 26, 1912 |
| 1,889,991 | Larsen | Dec. 6, 1932 |
| 1,986,512 | Meadowcraft | Jan. 1, 1935 |
| 2,179,326 | Eckman | Nov. 7, 1939 |
| 2,183,908 | Gladitz | Dec. 19, 1939 |

FOREIGN PATENTS

| Number | Country | Date |
|---|---|---|
| 213,774 | Switzerland | June 3, 1941 |